United States Patent
Menzel

(10) Patent No.: US 8,257,452 B2
(45) Date of Patent: Sep. 4, 2012

(54) METHOD FOR PRODUCING HYDROGEN AND POWER FROM A SYNTHESIS GAS

(75) Inventor: Johannes Menzel, Waltrop (DE)

(73) Assignee: UHDE GmbH, Dortmund (DE)

( * ) Notice: Subject to any disclaimer, the term of this patent is extended or adjusted under 35 U.S.C. 154(b) by 930 days.

(21) Appl. No.: 11/793,315

(22) PCT Filed: Dec. 21, 2005

(86) PCT No.: PCT/EP2005/013765
§ 371 (c)(1),
(2), (4) Date: Jun. 19, 2007

(87) PCT Pub. No.: WO2006/066892
PCT Pub. Date: Jun. 29, 2006

(65) Prior Publication Data
US 2008/0134686 A1 Jun. 12, 2008

(30) Foreign Application Priority Data
Dec. 21, 2004 (DE) .......................... 10 2004 062 687

(51) Int. Cl.
*C01B 3/36* (2006.01)
*C01B 3/24* (2006.01)
*C01B 6/24* (2006.01)
*B01J 7/00* (2006.01)

(52) U.S. Cl. ........... 48/197 R; 48/61; 48/198.3; 423/644
(58) Field of Classification Search .......... 48/61, 197 R; 423/644–658.2
See application file for complete search history.

(56) References Cited

U.S. PATENT DOCUMENTS

| 4,414,191 | A | 11/1983 | Fuderer |
| 4,695,442 | A | 9/1987 | Pinto et al. |
| 4,721,611 | A | 1/1988 | Pinto et al. |
| 4,725,380 | A | 2/1988 | Pinto |
| 4,725,381 | A | 2/1988 | Pinto |
| 4,733,528 | A | 3/1988 | Pinto |
| 4,936,869 | A | 6/1990 | Minderman et al. |
| 5,955,039 | A | 9/1999 | Dowdy |
| 6,051,195 | A * | 4/2000 | Deeke et al. .................. 422/198 |
| 7,004,985 | B2 | 2/2006 | Wallace et al. |

(Continued)

FOREIGN PATENT DOCUMENTS
DE 42 06 943 A1 9/1993
(Continued)

*Primary Examiner* — Matthew Merkling
(74) *Attorney, Agent, or Firm* — Marshall & Melhorn, LLC

(57) ABSTRACT

The invention relates to a method for producing hydrogen and power from a synthesis gas that contains CO, $H_2$ and $H_2S$. The synthesis gas is separated into two partial streams, vapor is added to the first partial stream of synthesis gas, out a CO conversion is carried out at a temperature of 220° C. to 500° C., pure hydrogen is obtained from the converted synthesis gas in a pressure swing absorption device and a residual PSA gas is produced. The second partial stream of synthesis gas is fed to a power-generating gas turbine for combustion, $H_2S$ and optionally other sulfur-containing components are removed in one or more separators that are arranged in any position in the process, however, before entry into the gas turbine, the residual PSA gas is mixed with nitrogen, the gas mixture so obtained is compressed and the compressed gas mixture is admixed to the partial stream of synthesis gas that is fed to the power-generating gas turbine.

5 Claims, 1 Drawing Sheet

U.S. PATENT DOCUMENTS

| | | |
|---|---|---|
| 7,087,652 B2 | 8/2006 | Abbott et al. |
| 7,168,488 B2 | 1/2007 | Olsvik et al. |
| 7,300,642 B1 * | 11/2007 | Pedersen et al. ............ 423/359 |
| 2003/0083391 A1 * | 5/2003 | Jahnke et al. ............ 518/703 |
| 2003/0192235 A1 * | 10/2003 | French et al. ............ 44/572 |
| 2004/0251241 A1 * | 12/2004 | Blutke et al. ............ 219/121.59 |

FOREIGN PATENT DOCUMENTS

| | | |
|---|---|---|
| DE | 196 51 282 A1 | 6/1998 |
| EP | 0 217 505 B1 | 11/1990 |
| WO | WO 03/018958 A1 | 3/2003 |
| WO | WO 03/022734 A1 | 3/2003 |
| WO | WO 03/062142 A1 | 7/2003 |

* cited by examiner

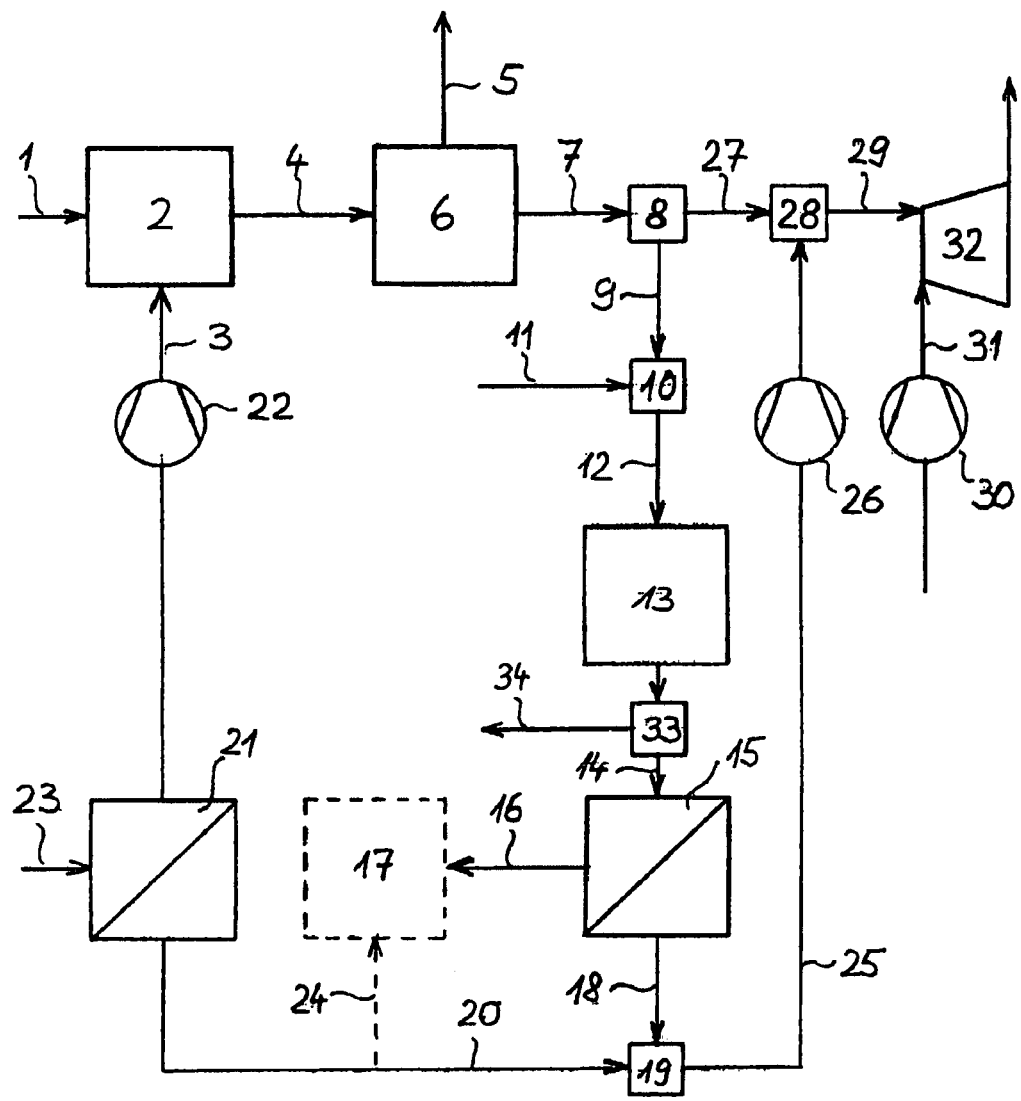

METHOD FOR PRODUCING HYDROGEN AND POWER FROM A SYNTHESIS GAS

BACKGROUND OF THE INVENTION

The invention relates to a process for generation of hydrogen and energy from synthesis gas. Processes of this type are suitable for chemical complex requirements, i.e. plants in which hydrogen is obtained as feedstock and which have a large number of consumers of electric power. A further application is specific to plants for ammonia production, which require large quantities of hydrogen for the ammonia production and which have a major requirement for mechanical energy needed for the compression of large gas amounts to a high pressure level.

Processes for a coupled generation of hydrogen and energy from synthesis gas using the conventional state of technology are known already; document DE 196 51 282 A1, for example, describes a process for the generation of raw hydrogen and electric energy from a hydrocarbon-bearing feedstock and/or coal in the IGCC process (IGCC—Integrated Gasification Combined Cycle) by means of a gas turbine. In this case, synthesis gas is first quenched with water, then at least a part stream of it undergoes a shift conversion and the gas obtained is split up if this was not done before, both part streams being subsequently subjected to a separate physical scrubbing. High-purity hydrogen can then be produced from the generated raw hydrogen in accordance with known processes.

This process, however, has the disadvantage that waste gases obtained by the high-purity hydrogen production cannot be exploited in this process. The objective of the invention, therefore, is to overcome the said disadvantage and to provide an efficient and energetically enhanced process.

BRIEF SUMMARY OF THE INVENTION

The objective of the invention is achieved by performing the following procedure:
 The synthesis gas stream is split up into two part streams;
 Steam is added first to one of the synthesis gas part streams and the said part stream then undergoes a CO conversion at a temperature ranging from 220° C. to 500° C.;
 A pressure swing adsorption unit (PSA) is subsequently used to produce high-purity hydrogen from the converted synthesis gas, a PSA residual gas being obtained, too;
 The other synthesis gas part stream is fed to a gas turbine for being burned and generating energy;
 $H_2S$ and further sulphurous components, if any, are separated in one or several separation devices arranged at any point of the process configuration, but in any case upstream of the gas turbine inlet;
 The PSA residual gas is mixed with nitrogen;
 The gas mixture obtained is subsequently compressed and
 The compressed gas mixture is added to the synthesis gas part stream then fed to the energy-generating gas turbine.

In accordance with a particularly beneficial embodiment of the process, the portion of nitrogen added to the PSA residual gas preferably amounts to 80% of the mixture thus obtained.

Synthesis gas normally with the following contents is used as feed gas: approx. 60% CO, approx. 20% $H_2$ and furthermore 20% $N_2$, $H_2S$, COS, $H_2O$, HCN, $CH_4$ and higher hydrocarbons which, however, were freed from noxious traces such as dust, HCl and $NH_3$ or the said matter was removed in a wet scrubbing system. If the synthesis gas originates from partial oxidation and/or from a plant for gasification of liquid or solid feedstock, the said portions may vary depending on the feedstock, CO being in the range of 30 to 60% and $H_2$ in the range of 20 to 50%. As a rule, synthesis gas is fed at a pressure of 20 to 80 bars upon having passed a thorough cooling operation directly after synthesis gas production normally taking place at temperatures ranging from 800 and 1600° C., thereby performing energy generation.

In a further embodiment of the process in accordance with the invention, the synthesis gas containing CO, $H_2$ and $H_2S$ is produced from coal or hydrocarbons or carbon-bearing residues or mixtures thereof, in a partial oxidation with the aid of high-purity oxygen or oxygen-rich air.

In a further embodiment of the process in accordance with the invention, the oxygen to be used in the partial oxidation is supplied by an air fractionation unit and the nitrogen thus obtained as by-product is partially added to the PSA residual gas which originates from hydrogen separation.

At least the synthesis gas part stream intended to be directly used for electric power generation must be desulphurised prior to the power generation, the COS contained in the synthesis gas first being converted by catalytic COS hydrolysis to form $H_2S$ and $CO_2$. The major part of HCN is also converted. The process gas stream leaving the COS hydrolysis is normally cooled to ambient temperature. Subsequently the $H_2S$ contained in the process gas is removed by a selectively acting scrubbing process leaving a few ppm only.

The said desulphurisation of the part stream required for hydrogen generation can take place either upstream or downstream of the CO conversion. A process suitable for desulphurisation is described in document DE 42 06 943 A1. If, however, the desulphurisation is carried out downstream of the CO conversion, i.e. after branching off the part stream intended for hydrogen generation, at least two desulphurisation units will be required, at least one unit for each of the two part streams.

A further embodiment of the process in accordance with the invention, therefore, provides for a desulphurisation to be performed prior to splitting up into two part streams, one being required for hydrogen generation and the other one for energy generation in a gas turbine.

The ratio of the two streams after branching off may range from 1:2 to 2:1. However, it may also be variable in order to achieve the best ratio satisfying the market requirements.

The portion serving for hydrogen generation is mixed with steam in order to subsequently carry out a CO conversion also designed as CO shift, hence as Sweet Shift if desulphurisation has taken place before, or as Sour Shift if desulphurisation has not taken place. The quantity depends on the CO content of the synthesis gas and the amount to be added must be such that the process gas leaving the CO conversion unit has a minimum concentration of water vapour, e.g. 0.3 mol water vapour per mol gas.

In the CO conversion, CO is converted to $H_2$ according to the following formula:

$$CO + H_2O \Rightarrow CO_2 + H_2 \qquad (1),$$

the temperature ranging from 220° C. to 500° C. The process fluid obtained is, for example, a gas with approx. 45% $CO_2$, 50% $H_2$ and a residual content of CO and $N_2$, or a gas with 60% $H_2$ and 35% $CO_2$ and a residual content of 3% CO and 2% $N_2$.

The converted synthesis gas is subsequently fed to a pressure swing adsorption unit (termed PSA—Pressure Swing Adsorption) to generate high-purity $H_2$ at a degree of purity of, for example, 99.8%. The PSA off-gas obtained is, for example, a gas with approx. 19% $H_2$, 72% $CO_2$, 7% CO and 1% of other gas components at low pressure, approx. 1.3 bar abs., for example.

The PSA off-gas is subsequently mixed with $N_2$, the obtained mixture is compressed to the gas turbine pressure and upstream of the turbine, it is added to the synthesis gas part stream branched off before. This admixture serves to reduce the calorific value of the burning gas fed to the gas turbine, which helps to avoid temperature peaks during the burning of the gas in the gas turbine so that formation of $NO_x$ is minimised to the effect that this at least complies with the legal requirements.

This moderation is performed in accordance with the conventional state of technology, using nitrogen also obtained by the air fractionation process, oxygen being for example required in the gasification units. Nitrogen which is pressurised to the value of the gas turbine, is normally sent to a specific nitrogen compressor and the flow rate can be controlled such that in a given load range, the gas turbine can be operated in a work range favourable to ensure minimal $NO_x$ formation.

If, contrary to the method described above, the PSA off-gas is used with a substantially reduced portion of additional nitrogen to control the gas turbine moderation—compared to the turbine moderation exclusively with the aid of nitrogen, the following benefits can be achieved:

- The re-compression of PSA off-gas and nitrogen can be carried out by a single compressor. Compared to the gas turbine moderation with the aid of pure nitrogen, no extra costs are incurred with regard to the investment required nor operational costs.
- The calorific value of the PSA off-gas is perfectly converted at low energy in the gas turbine on account of the residual $H_2$ and CO. The conversion is by far more efficient than, for example, an atmospheric post-combustion with integrated steam generation such as it is used in plants operated according to the conventional state of technology. Finally this leads to savings in feedstock for synthesis gas generation (coal, gas petroleum), which need not be off-set against any other expenditure such as in respect of an additional compressor or against higher operational costs for additional compression energy, which otherwise—as an option to PSA off-gas for the compression—would necessitate an accordingly larger amount of nitrogen.
- The air fractionation unit can be of the economical low-pressure type, the nitrogen simultaneously obtained by air fractionation being suitable for export at a pressure of approx. 1.3 bars, which equals the feed pressure of the PSA off-gas.
- If nitrogen is intended to be used for $NH_3$ production, the lower $N_2$ consumption permits savings in the overall production costs because more $N_2$ becomes available for $NH_3$ production.

BRIEF DESCRIPTION OF THE DRAWINGS

The invention is hereinafter illustrated on the basis of flow-sheet shown on the FIGURE in accordance with the invention, i.e. in a very simplified block diagram, encompassing the gasification, scrubbing, hydrogen generation and energy production; it is pointed out that the process described in the invention is not restricted to the typical embodiment shown here.

DETAILED DESCRIPTION OF THE INVENTION

Partial oxidation 2 is used to produce synthesis gas 4 from coal 1 and oxygen 3, the synthesis gas 4 subsequently being treated in purification process 6 to remove undesired components, in particular sulphurous components 5. Purified synthesis gas 7 is then split up into two part streams in branch section 8.

Part stream 9 is mixed with steam 11 at feed point 10. Steam-enriched synthesis gas 12 is then fed to CO conversion unit 13 in which a hydrogen-rich synthesis gas is generated. After cooling of the gas downstream of the CO conversion, gas condensate 34 is separated from the process in condensate separator 34. Downstream pressure swing adsorption unit 15 is used to produce high-purity hydrogen 16 from hydrogen-rich synthesis gas 14, the said hydrogen 16 becoming available, for example, for an optional ammonia production unit 17 or for hydrocarbon hydrogenation in a refinery.

PSA off-gas 18 is mixed with a part of nitrogen 20 in mixer 19, the nitrogen being generated from air 23 in air fractionation unit 21, which even after a pressure rise in oxygen compressor 22 can supply oxygen 3 for partial oxidation 2. Replacing nitrogen by PSA off-gas permits, for example, a supply of additional nitrogen 24 to optional ammonia production unit 17.

Gas mixture 25 consisting of PSA off-gas 18 and nitrogen 20 first undergoes a pressurisation by nitrogen compressor 26 and is then added in mixer 28 to the other part stream 27 of the purified synthesis gas. Burning gas 29 thus obtained and air 31 compressed in air compressor 30 are burned in gas turbine 32, thereby generating energy. The mechanical shaft energy thus obtained is suitable for generating electric power and for driving the individual compressors needed and if there is an interconnected system of plant units, including an optional ammonia production unit 17, the compression energy required can be supplied by gas turbine 32, too.

The following design calculation example serves for further illustration, the stream numbers comply with FIG. 1 and all quantities involved are indicated in mol/h.

| | Stream | | | | | | | | | | |
|---|---|---|---|---|---|---|---|---|---|---|---|
| | 7 | 11 | 12 | 14 | 16 | 18 | 20 | 25 | 27 | 29 | 34 |
| CO | 5186.4 | 0.0 | 3140.9 | 284.5 | 0.0 | 284.4 | 0.00 | 284.4 | 2045.5 | 2330.0 | 0.0 |
| $H_2$ | 4340.7 | 0.0 | 2628.7 | 5485.2 | 4662.4 | 822.8 | 0.00 | 822.8 | 1712.0 | 2534.8 | 0.0 |
| $CO_2$ | 398.4 | 0.0 | 241.3 | 3097.8 | 1.8 | 3096.0 | 0.00 | 3096.0 | 157.1 | 3253.1 | 0.0 |
| $CH_4$ | 23.8 | 0.0 | 14.4 | 14.4 | 0.0 | 14.4 | 0.00 | 14.4 | 9.4 | 23.7 | 0.0 |
| $N_2$ | 32.3 | 0.0 | 19.6 | 19.6 | 0.0 | 19.6 | 1800.00 | 1819.6 | 12.8 | 1832.3 | 0.0 |
| Ar | 12.0 | 0.0 | 7.3 | 7.3 | 0.0 | 7.3 | 0.00 | 7.3 | 4.7 | 12.0 | 0.0 |
| $H_2S$ | 0.4 | 0.0 | 0.3 | 0.3 | 0.0 | 0.3 | 0.00 | 0.3 | 0.2 | 0.5 | 0.0 |
| COS | 0.2 | 0.0 | 0.1 | 0.1 | 0.0 | 0.1 | 0.00 | 0.1 | 0.1 | 0.2 | 0.0 |
| $NH_3$ | 0.0 | 0.0 | 0.0 | 0.0 | 0.0 | 0.0 | 0.00 | 0.0 | 0.0 | 0.0 | 0.0 |
| HCN | 0.0 | 0.0 | 0.0 | 0.0 | 0.0 | 0.0 | 0.00 | 0.0 | 0.0 | 0.0 | 0.0 |
| $H_2O$ | 21.5 | 9916.9 | 9930.2 | 10.2 | 0.0 | 10.2 | 0.00 | 10.2 | 8.19 | 18.4 | 7063.6 |
| Total | 10015.8 | 9916.9 | 15982.8 | 8919.3 | 4664.2 | 4255.1 | 1800.0 | 6055.1 | 3949.9 | 10005.0 | 7063.6 |

| Key to referenced items | |
|---|---|
| 1 | Coal |
| 2 | Partial oxidation |
| 3 | Oxygen |
| 4 | Raw synthesis gas |
| 5 | Sulphurous components |
| 6 | Purification process |
| 7 | Purified synthesis gas |
| 8 | Branch section |
| 9 | Part stream |
| 10 | Feed point |
| 11 | Steam |
| 12 | Steam-enriched synthesis gas |
| 13 | CO conversion unit |
| 14 | Hydrogen-rich synthesis gas |
| 15 | Pressure swing adsorption unit |
| 16 | High-purity hydrogen |
| 17 | Optional ammonia production unit |
| 18 | PSA off-gas |
| 19 | Mixer |
| 20 | Nitrogen |
| 21 | Air fractionation unit |
| 22 | Oxygen compressor |
| 23 | Air |
| 24 | Nitrogen |
| 25 | Gas mixture |
| 26 | Nitrogen compressor |
| 27 | Part stream |
| 28 | Mixer |
| 29 | Burning gas |
| 30 | Air compressor |
| 31 | Compressed air |
| 32 | Gas turbine |
| 33 | Condensate separator |
| 34 | Gas condensate |

The invention claimed is:

1. A process for generation of hydrogen and energy from synthesis gas which contains at least CO, $H_2$ and $H_2S$, with the following procedure being performed:

the synthesis gas stream is split up into two part streams;

steam is added first to one of the synthesis gas part streams and the part stream then undergoes a CO conversion at a temperature ranging from 220° C. to 500° C.;

a pressure swing adsorption unit (PSA) is subsequently used to produce high-purity hydrogen from the converted synthesis gas, a PSA residual gas being obtained, too;

from the other synthesis gas part stream, $H_2S$ and further sulphurous components are separated in one or several separation devices, and the so desulphurized stream is fed to a gas turbine for being burned and for generating energy, with the desulphurization arranged at any point of the process, but in any case upstream of the gas turbine inlet; characterized in that the PSA residual gas is mixed with nitrogen to form a gas mixture;

the gas mixture obtained is subsequently compressed;

the compressed gas mixture is added to the synthesis gas part stream upstream of the gas turbine to the synthesis gas part stream branched off before and then fed to the gas turbine; and wherein the gas mixture of nitrogen and the PSA residual gas to the gas turbine has a flow rate which is controlled by a mixer such that in a given load range, the gas turbine is operated in a working range favorable to ensure minimum $NO_x$ formation.

2. A process according to claim 1, wherein the portion of nitrogen added to the PSA residual gas amounts to 80% of the mixture thus obtained.

3. A process according to claim 1, wherein the synthesis gas containing CO, $H_2$ and $H_2S$ is produced from coal or hydrocarbons or carbon-bearing residues or mixtures thereof, in a partial oxidation with the aid of high-purity oxygen or oxygen-rich air.

4. A process according to claim 3, wherein the oxygen to be used in the partial oxidation is supplied by an air fractionation unit and the nitrogen thus obtained as by-product is partially added to the PSA residual gas which originates from hydrogen separation.

5. A process according to claim 1, wherein $H_2S$ and other sulphurous components, if any, are separated by means of just one separation device arranged in the process configuration upstream of the point where the splitting up into two part streams takes place.

* * * * *